Dec. 2, 1924.
F. H. BLANDING
CUTTING TOOL
Filed Jan. 31, 1924
1,517,395
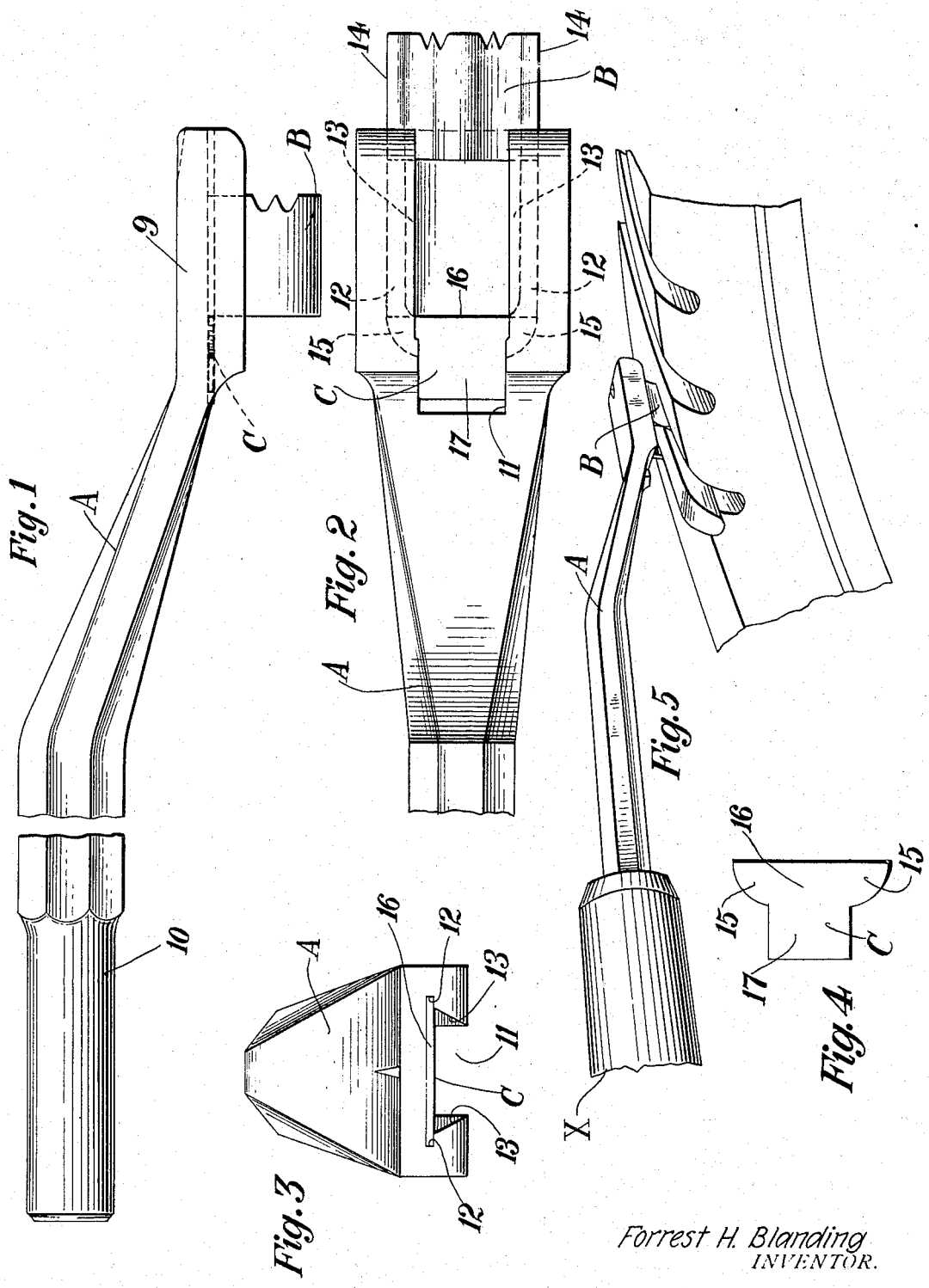
Forrest H. Blanding
INVENTOR.
BY Ira L. Nickerson
his ATTORNEY.

Patented Dec. 2, 1924.

1,517,395

UNITED STATES PATENT OFFICE.

FORREST H. BLANDING, OF DETROIT, MICHIGAN, ASSIGNOR TO CHICAGO PNEUMATIC TOOL COMPANY, OF NEW YORK, N. Y., A CORPORATION OF NEW JERSEY.

CUTTING TOOL.

Application filed January 31, 1924. Serial No. 689,617.

*To all whom it may concern:*

Be it known that I, FORREST H. BLANDING, a citizen of the United States of America, and resident of Detroit, in the county of Wayne and State of Michigan, have invented certain new and useful Improvements in Cutting Tools, of which the following is a specification.

This invention relates to cutting tools of the type particularly adapted for cutting designs in the treads of vehicle tires, for regrooving such tire treads after they have become worn, and for similar uses. More particularly it has to do with tools of this kind which have a separable blade or cutting element. One well known tool of this kind has a channelled blade of resilient material slidably seated in a groove in the holder and retained therein by its own resiliency.

In such tools it is essential that the abutment against which the blade bears in effecting the cut be squarely transverse to the direction of the cut, or such as to maintain the sides of the channelled blade in parallelism with the axis of the cut, since otherwise the blade is subjected to distortive strain resulting in breakage of the blade or tearing the same from its socket. Heretofore it has been proposed to provide an accurately disposed abutment for the blade by making a transverse bore through the blade holder in the plane of the blade retaining grooves. Such an arrangement is highly objectionable since the transverse bore weakens the holder which has to withstand shattering strains of great intensity due to the blows of the percussive tool and the violent reaction thereto of the material through which the blade must be forced. Hence one of the primary objects of the invention is to provide a properly disposed abutment for the blade without weakening the holder. Other objects will be apparent from the detailed description of the invention which follows.

In its simplest form the invention comprises the use of a separate abutment member in a cutting tool of the described type. Such a member, which may be blanked from sheet material or otherwise cheaply constructed, preferably slides in the blade receiving channel ahead of the blade and is arranged to be maintained against angular displacement within the channel. In order to make clear the invention, one concrete embodiment thereof is shown in the accompanying drawings, in which:

Fig. 1 is a side elevational view of the cutting tool;

Fig. 2 is a bottom plan view partly broken away showing the abutment member in place and a cutting element about to be inserted;

Fig. 3 is a right end elevation of the device shown in Fig. 1, with the cutting element removed;

Fig. 4 is a detail plan view of the abutment member;

Fig. 5 is a perspective view illustrating the cutting tool in operation.

In the embodiment of the invention illustrated, the cutting tool comprises three distinct but cooperating parts, a holder A, a cutting element B, and an abutment member C for the cutting element. The holder has a relatively wide head 9 from which extends a shank terminating in a handle 10 which is preferably shaped and intended to receive the blow of a percussive motor. The lower face of the head 9 of the holder has a longitudinal recess or channel 11 (Fig. 3) having its sides undercut by longitudinal grooves 12 extending part way through the head and merging into channel 11 by the provision of the bevelled faces 13 on the head adjacent the channel.

The cutting element or blade B is adapted to be removably supported within the channel 11 of the head 9 and to dispose a cutting edge beneath said head. For this purpose the element is channel shaped and of spring steel, provided with longitudinal side flanges 14 which fit within the grooves 12, the adjacent inclined sides of the blade fitting against the bevelled surfaces 13 of head 9. The cutting element is inserted within the channel of the holder head by springing the sides of the element toward each other and starting the side flanges 14 within the grooves 12 whereupon the blade may be slid along the channel 11 to the position illustrated in Fig. 1, the blade now being held in the holder by its own resiliency.

In order to keep the flanges of the blade from contact with the rounded milled ends of the grooves 12 and to suitably support the blade within the channel so that it may not be broken or torn out while in operation, abutment means are provided within the channel 11 and form an important feature of the invention. The preferred means for this purpose comprise the abutment member or plate C of a size and shape to fit within and to span channel 11. Member C has side extensions 15 fitting within the grooves 12 and providing abutments for the flanges 14 of the cutting element, these abutments forming a part of the transverse end or abutment face 16. The extensions 15 are rounded rearwardly as indicated to fit the rounded ends of grooves 12. The abutment portion of member C has a tail extension 17, the sides of which fit the sides of channel 11 beyond grooves 12 and prevent angular displacement of the member C within the channel 11. For convenience and ease in manufacture, the abutment member C is made as a separate element, but after it has been slipped into place within the channel 11 it may be secured therein in any suitable or desired manner. Member C which is of a thickness to closely fit the grooves 13, may be cheaply constructed by blanking from sheet material.

In preparing the cutting tool for use, the abutment member C is first slid into the position illustrated in Fig. 2 with the rear faces of the side extensions 15 in contact with the ends of grooves 12 and the tail piece 17 within the channel 11 beyond the grooves. The cutting element or blade B is then sprung into the channel in the manner heretofore described and slid longitudinally thereof until the ends of the side flanges 14 contact the abutment face 16 of member C. The tool is now ready for operation, the manner of its use being illustrated in Fig. 5 wherein it is shown as making grooves in a truck tire, the cutout portions of the tire tread passing out beneath the abutment C and under the shank portion of the holder. While the holder A may be manually supported and the end of the handle 10 struck with a hammer, it is preferable to use for driving the blade through such highly resistant material as that of truck tires a percussive device such as a pneumatic hammer indicated at X in Fig. 5.

While but one form of the invention has been herein disclosed, it is to be understood that the invention is not limited to this specific form but is capable of adaptation and modification within the scope of the appended claims.

Having now described my invention and the manner of its use, what I claim and desire to secure by Letters Patent is:

1. In a device of the class described, the combination of a holder having grooves, a cutting element having edges retained in said grooves, and means engaging said grooves and providing an abutment for said element.

2. In a device of the class described, combination of a holder having grooves, a cutting element having edges retained in said grooves, and a member having parts engaging said grooves and providing an abutment for said element.

3. In a device of the class described, the combination of a holder having a channel therein and grooves opening into said channel, a channel-shaped cutting element having side flanges fitting in said grooves, and means engaging said grooves providing abutments for the side flanges of said element.

4. In a device of the class described, the combination of a holder having a channel therein and grooves opening into said channel for receiving the side flanges of a channel-shaped cutting element, and means disposed within said channel to provide an abutment for the cutting element.

5. In a device of the class described, the combination of a holder having a channel therein and grooves opening into said channel, a channel-shaped cutting element having side flanges fitting in said grooves, and means spanning said channel and engaging said grooves to provide an abutment for said element.

6. In a device of the class described, the combination of a holder having a channel therein and grooves opening into said channel, a channel-shaped cutting element having side flanges fitting in said grooves, a removable member spanning said channel and having parts fitting within said grooves to provide an abutment for said element.

7. In combination, a channel-shaped cutting element of resilient material, a holder having a recess in which said element is retained by its own resiliency, and removable means disposed within said recess and providing an abutment transverse to the longitudinal axis of said element.

8. In combination, a holder having a channel therein and grooves merging into said channel for a portion of its length, a channel-shaped cutting element having side flanges fitting in said grooves, and a member blanked from sheet material seated in said channel and presenting an abutment face engaged by the ends of the flanges of said element.

9. In combination, a holder having a channel therein and grooves merging into said channel for a portion of its length, a channel-shaped cutting element having side flanges fitting in said grooves, and a member seated in said channel having projections extending within said grooves to form abutments for the ends of the flanges of said element, the other faces of said projections being shaped to fit the ends of said grooves.

10. In combination, a holder having a channel therein and grooves merging into said channel for a portion of its length, a channel-shaped cutting element having side flanges fitting in said grooves, and a member blanked from sheet material seated in said channel with projecting portions at the sides fitting said grooves to form abutments for the ends of the flanges of said element, the other faces of said portions being shaped to fit the ends of said grooves, and with a tail piece fitting the channel beyond said grooves to prevent angular displacement of said member within said channel.

11. An abutment piece for the channelled blades of cutting tools in which the blade holder has a channel with undercut sides forming a socket for slidably receiving the blade, said piece comprising a member adapted to be disposed in said channel with side portions fitting said grooves to present an abutment face transverse to said channel.

12. An abutment piece for the channelled blades of cutting tools in which the blade holder has a channel with undercut sides forming a socket for slidably receiving the blade, said piece comprising a member adapted to be disposed in said channel having integral side extensions making a sliding fit with said grooves and shaped to fit the ends of said grooves to present to the blade an abutment face transverse to said channel.

13. An abutment member for the channelled blades of cutting tools in which the tool holder has a channel, the sides of which are undercut as to a portion of its length by grooves merging into the channel, said member comprising a plate adapted to span said channel and having side extensions fitting into said grooves and a tail extension fitting the channel beyond said grooves to prevent angular displacement of the member within said channel.

14. An abutment piece for tools of the class described blanked from sheet material having parallel sides and a transverse front face projecting beyond said sides and curved faces joining said front face to said parallel sides.

Signed by me at Detroit, Michigan this 28th day of January 1924.

FORREST H. BLANDING.